United States Patent
Short et al.

(10) Patent No.: US 8,308,344 B2
(45) Date of Patent: Nov. 13, 2012

(54) MIXING MACHINE WITH ASSOCIATED BOWL GUARD SYSTEM

(75) Inventors: Ellis G. Short, Troy, OH (US); Joseph C. Huang, Dayton, OH (US); Janice Jones Schnipke, Springfield, OH (US)

(73) Assignee: Premark FEG L.L.C., Glenview, IL (US)

( * ) Notice: Subject to any disclaimer, the term of this patent is extended or adjusted under 35 U.S.C. 154(b) by 1285 days.

(21) Appl. No.: 12/019,024

(22) Filed: Jan. 24, 2008

(65) Prior Publication Data

US 2009/0190438 A1 Jul. 30, 2009

(51) Int. Cl.
*B01F 15/00* (2006.01)
(52) U.S. Cl. .......................................... 366/347; 366/197
(58) Field of Classification Search .................. 366/347, 366/197; 384/22, 148, 225, 232, 233, 615
See application file for complete search history.

(56) References Cited

U.S. PATENT DOCUMENTS

| | | | | |
|---|---|---|---|---|
| 1,353,299 | A | * | 9/1920 | Wilson .............................. 279/75 |
| 3,302,960 | A | * | 2/1967 | Herrmann ...................... 403/325 |
| 3,727,771 | A | * | 4/1973 | Hoffman .......................... 211/69 |
| 3,875,423 | A | | 4/1975 | Kemper |
| 5,306,083 | A | | 4/1994 | Caldwell et al. |
| 5,348,393 | A | | 9/1994 | Pappas, Jr. |
| 5,472,276 | A | | 12/1995 | Ratermann et al. |
| 5,533,806 | A | | 7/1996 | Veltrop et al. |
| 6,062,725 | A | | 5/2000 | Paturel et al. |
| 6,068,398 | A | | 5/2000 | Lin |
| 6,435,708 | B1 | | 8/2002 | Huang |
| 6,827,481 | B2 | | 12/2004 | Yoshioka |
| 7,104,418 | B2 | * | 9/2006 | Kamenstein ..................... 221/33 |
| 7,384,187 | B2 | | 6/2008 | Blackburn et al. |
| 7,543,980 | B2 | | 6/2009 | Blackburn et al. |
| 2003/0205103 | A1 | * | 11/2003 | Vaughn ........................ 74/594.1 |
| 2004/0022124 | A1 | | 2/2004 | Yoshioka |

(Continued)

FOREIGN PATENT DOCUMENTS

DE 4417956 12/1994
(Continued)

OTHER PUBLICATIONS

PCT, International Search Report and Written Opinion, PCT/US2009/030790 (21 pages) (Oct. 9, 2009).

(Continued)

*Primary Examiner* — Michael Marcheschi
*Assistant Examiner* — Jonathan Hurst
(74) *Attorney, Agent, or Firm* — Thompson Hine LLP

(57) ABSTRACT

A mixing machine includes a mixer body including a head portion that extends over a bowl receiving location. An output member extends downward from the head portion toward the bowl receiving location. A drive system is linked to the output member for effecting planetary rotation of the output member. A bowl guard support is at an underside of the head portion. The bowl guard support provides a circular support path in the form of a groove extending about a periphery of the bowl guard support. A bowl guard assembly includes a housing member and a catch member extending from a surface of the housing member. The catch member is received within the groove to maintain a vertical position of the bowl guard assembly while permitting rotation of the bowl guard assembly. The catch member is movable relative to the housing member and is biased into the groove to seat therein.

2 Claims, 7 Drawing Sheets

U.S. PATENT DOCUMENTS

2006/0227654 A1  10/2006  Blackburn et al.

FOREIGN PATENT DOCUMENTS

| | | |
|---|---|---|
| EP | 0512172 | 10/1995 |
| EP | 1027920 | 8/2000 |
| FR | 2740064 | 4/1997 |
| GB | 2255608 | 11/1992 |
| WO | 93/19606 | 10/1993 |

OTHER PUBLICATIONS

PCT, Invitation to Pay Additional Fees and Partial International Search, PCT/US2209/030790 (Jul. 20, 2009).

PCT, International Preliminary Report on Patentability, PCT/US2009/030790 (Aug. 5, 2010).

* cited by examiner

MIXING MACHINE WITH ASSOCIATED BOWL GUARD SYSTEM

TECHNICAL FIELD

This application relates generally to mixing machines of the type used to mix food products and, more particularly, to a bowl guard system used in connection with such mixing machines.

BACKGROUND

Mixers are used to mix and blend a variety of materials, such as food product. Typically, the materials are placed in a bowl and the bowl is located below a mixer head that includes a rotatable output member with a mixer tool. Various bowl guard arrangements are known in connection with such mixers. For example, U.S. patent application Ser. No. 11/102,136, filed Apr. 8, 2005 describes a mixer that includes (i) an installable and removable bowl guard member, (ii) a bowl guard sensor arrangement, (iii) a bowl guard support ring assembly, and (iv) a bowl guard support ring assembly and bowl guard member that interact for limiting movement of the bowl guard member.

SUMMARY

In an aspect, a mixing machine including a mixer body including a head portion that extends over a bowl receiving location. An output member extends downward from the head portion toward the bowl receiving location. A drive system is linked to the output member for effecting planetary rotation of the output member. A bowl guard support is at an underside of the head portion. The bowl guard support provides a circular support path in the form of a track extending about a periphery of the bowl guard support. A bowl guard assembly includes a moveable member comprising a housing member and a catch member extending from a surface of the housing member. The catch member is received within the track to maintain a vertical position of the moveable member while permitting rotation of the moveable member. The catch member is movable relative to the housing member and biased into the groove to seat therein.

In another aspect, a mixing machine includes a mixer body including a head portion that extends over a bowl receiving location. An output member extends downward from the head portion toward the bowl receiving location. A drive system is linked to the output member for effecting planetary rotation of the output member. A bowl guard assembly includes a moveable member mounted on the head and arranged for rotational movement. The moveable member includes a magnet. A magnetically actuatable bowl guard sensor is in the head portion for detecting when the moveable member is in a bowl guarding position. Operation of the drive system is affected by whether the moveable member is in the bowl guarding position. A magnetically conductive member is in the head portion for conducting magnetic field from the magnet to the magnetic sensor when the moveable member is in the bowl guarding position. A splash guard is connected to the mixer body. The moveable member is moveable relative to the splash guard. When the moveable member is in the bowl guarding position, the moveable member and the splash guard substantially surround the output member. The splash guard supports the magnetically conductive member in the head portion such that removal of the splash guard causes the magnetically conductive member to move to a position away from the sensor such that the magnetic sensor cannot be triggered by the magnet when the moveable member is in the bowl guarding position.

In another aspect, a method of providing a bowl guard arrangement for a mixing machine is provided. The method includes providing a bowl guard support at an underside of a head portion of a mixer body extending over a bowl receiving location. The mixer body includes an output member extending downward from the head portion toward the bowl receiving location and a drive system for effecting planetary rotation of the output member. A moveable member of a bowl guard assembly is connected to a bowl guard support at an underside of the head portion. The bowl guard support provides a circular track extending about a periphery of the bowl guard support. The moveable member comprising a housing member and a catch member extending into the track. The catch member is movable relative to the housing member. The catch member is biased toward the track to seat the catch member in the track while enabling the catch member to move out of the track when the moveable member is moved vertically downward relative to the bowl guard support such that the moveable member is removable from the bowl guard support via a single downward movement.

The details of one or more embodiments are set forth in the accompanying drawings and the description below. Other features, objects, and advantages will be apparent from the description and drawings, and from the claims.

DETAILED DESCRIPTION

Figure 1:
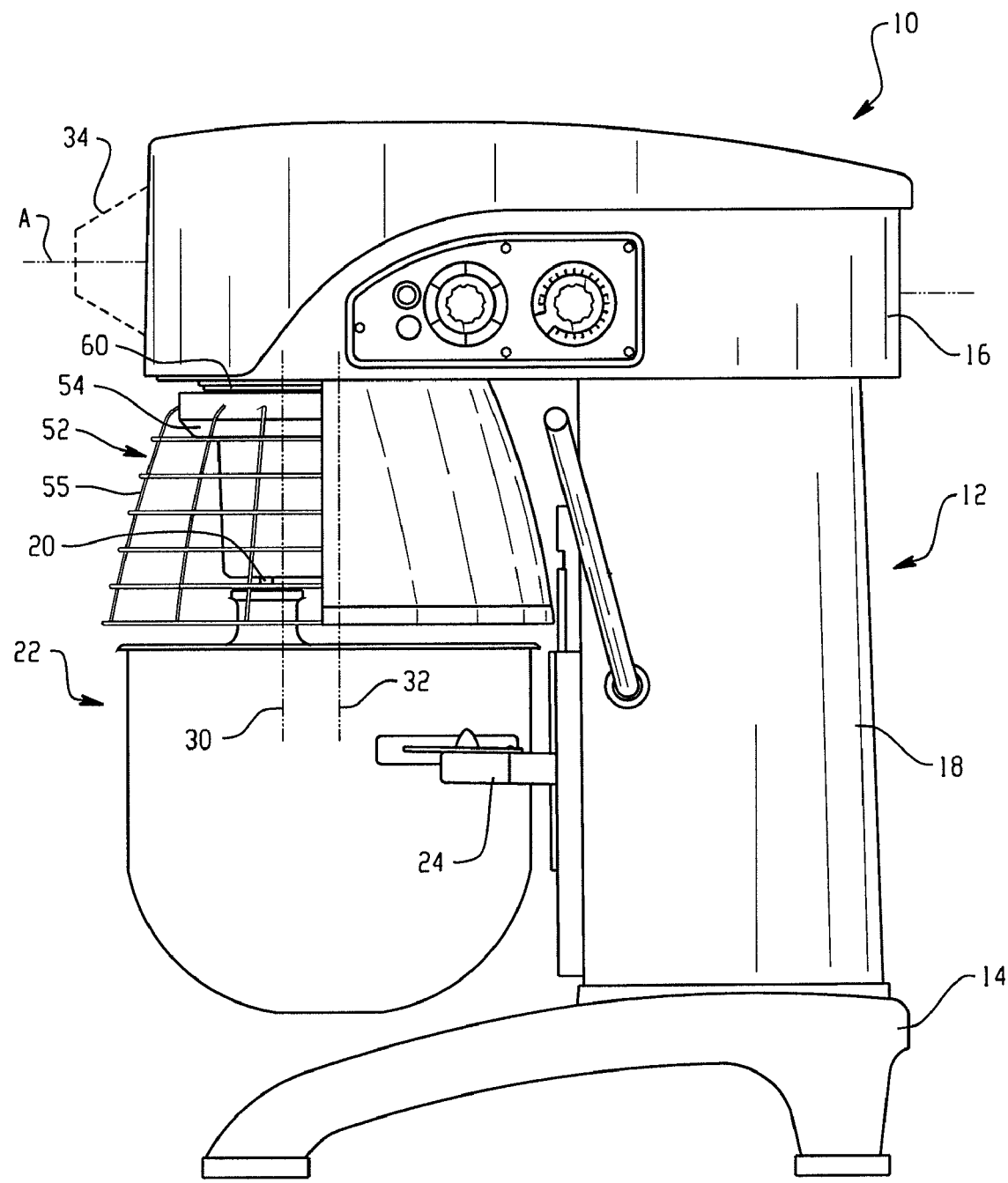
FIG. 1 is a side view of an embodiment of a mixing machine.
Figure 2:
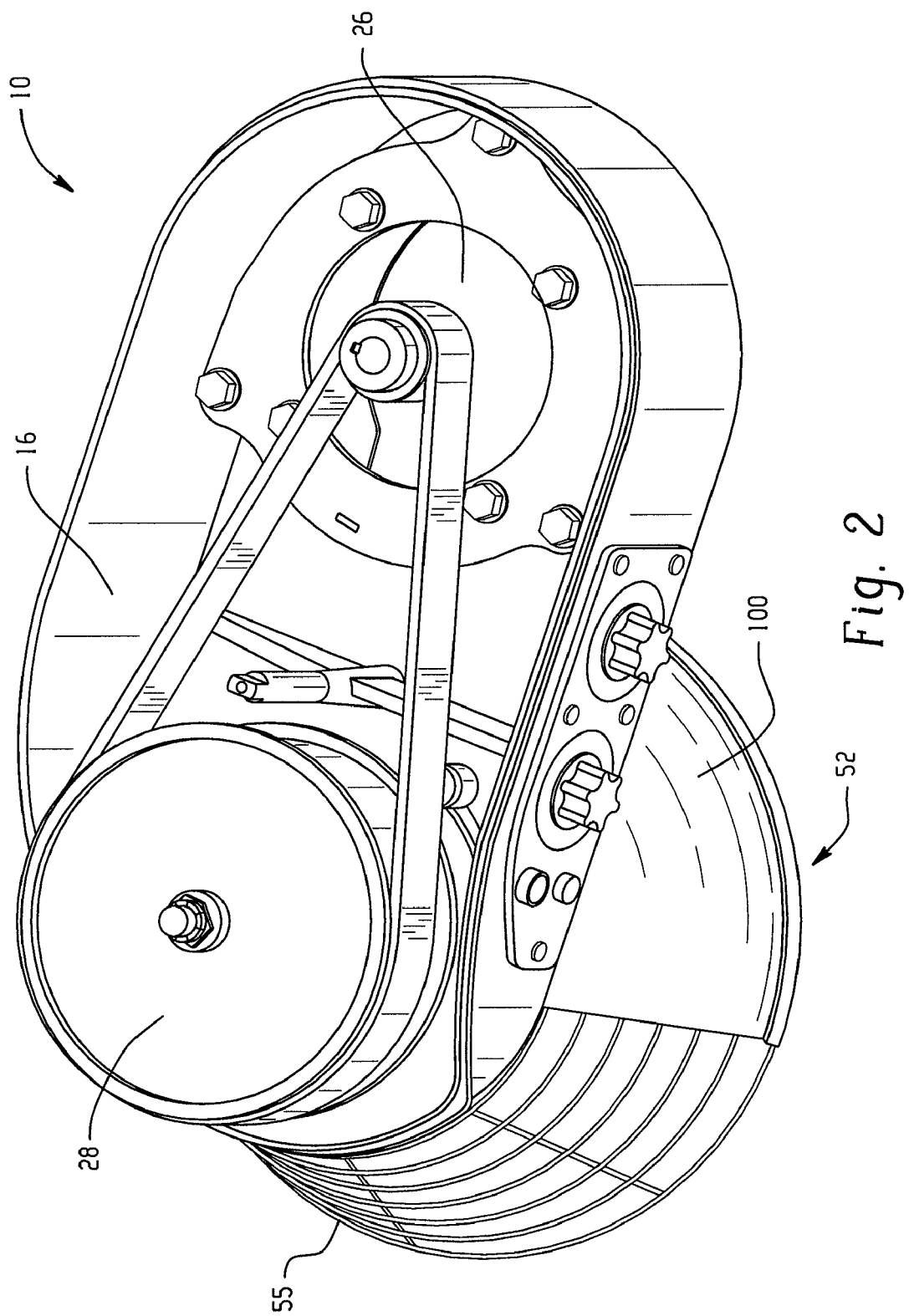
FIG. 2 is a top, perspective view of an embodiment of a head portion of the mixing machine of FIG. 1.

Referring to FIGS. 1 and 2, a mixing machine 10 includes a mixer body 12 having a base portion 14, a head portion 16 and a support portion 18 (e.g., in the form of a column) connecting the head and base portions in a vertically, spaced-apart relationship. A front-to-back head portion axis A is shown. An output member 20 (e.g., a shaft for receiving a mixer tool, such as a beater or whip) extends downward from the head portion 16 in a direction toward a bowl receiving location 22 formed between arms 24 of a bowl receiving yoke that can be moved up and down relative to the head portion by rotation of the illustrated handle. A motor 26 may be mechanically linked to the output member 20, as by a gear system 28, for effecting rotation of the output member about a first axis 30 and orbiting movement of the output member and first axis about a second axis 32 (e.g., a planetary movement or planetary rotation). A power take off 34 (represented by dashed lines) extends outwardly from a front side of the head portion 16 and may take the form of a protruding hub or boss that is adapted for connection to mixer accessories such as meat grinders, slicers etc. Internal of the power take off 34 may be a drive member that is rotated by the motor 26 via the gear system 28. Head cover 40 is shown installed in FIG. 1, but is removed in FIG. 2.

An exemplary mix position of a bowl 50 is shown by FIG. 1, along with an exemplary position of a bowl guard assembly 52. A bowl guard support 54 is located at the underside of the head portion 16 and supports at least part of the bowl guard assembly 52 in a manner that allows the bowl guard assembly to be moved between a bowl guarding position and a bowl access position.

Figure 3:
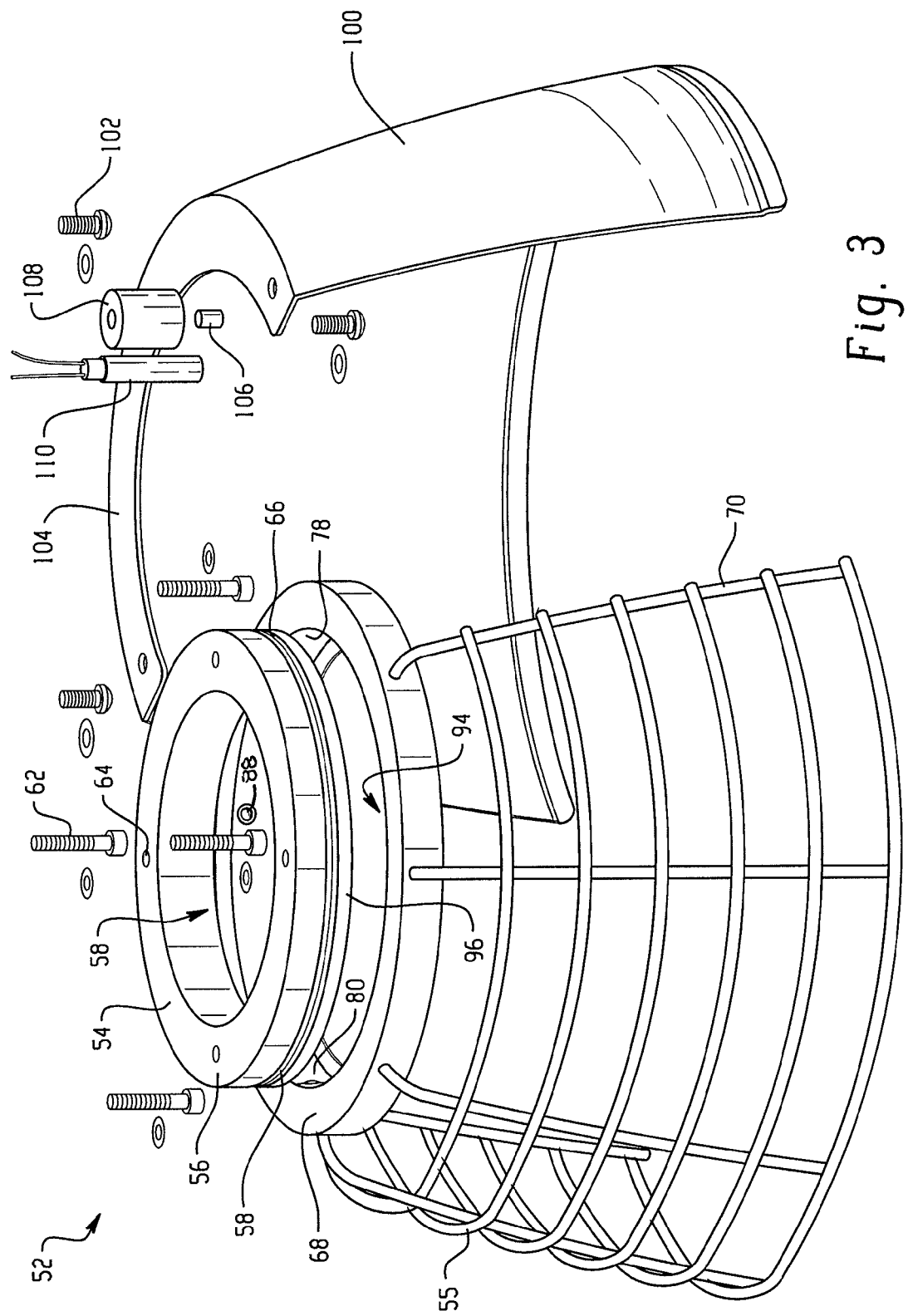
FIG. 3 is an exploded view of an embodiment of a bowl guard assembly and splash guard for use with the mixing machine of FIG. 1.

Referring to FIG. 3, the bowl guard support 54 is formed of a ring-shaped body 56 that is positioned adjacent an underside of the head portion 16. The bowl guard support 54 includes a central opening 58 that may be disposed about a cylindrical, downward extension 60 (FIG. 1), which may be part of a metal casing of the head portion 16. The bowl guard support 54 may be fastened underneath the head portion 16 by fasteners 62 that extend through openings 64 in the ring-shaped body 56. Alternatively, the bowl guard support 54 may be formed unitary with the metal casing of the head portion 16.

The bowl guard support 54 includes a circular track (e.g., groove 58) that extends inwardly from a periphery of the ring-shaped body 56. The groove 58 provides a support path that is used to vertically support the bowl guard assembly 52, as will be described below. A detent 66 (e.g., a vertically-oriented recess) is provided in the groove 58. The detent 66 provides tactile feedback for an operator when the bowl guard assembly 52 is placed in the bowl guarding position and some resistance to moving the bowl guard assembly from the bowl guarding position. While the groove 58 is illustrated as extending continuously about the entire periphery of the bowl guard support, in other embodiments, the groove may extend only partially about the periphery of the bowl guard support.

In some embodiments, the bowl guard support 54 is formed of a metal material, such as stainless steel. Alternatively, the bowl guard support 54 may be formed of a suitable plastic material.

Figure 4:
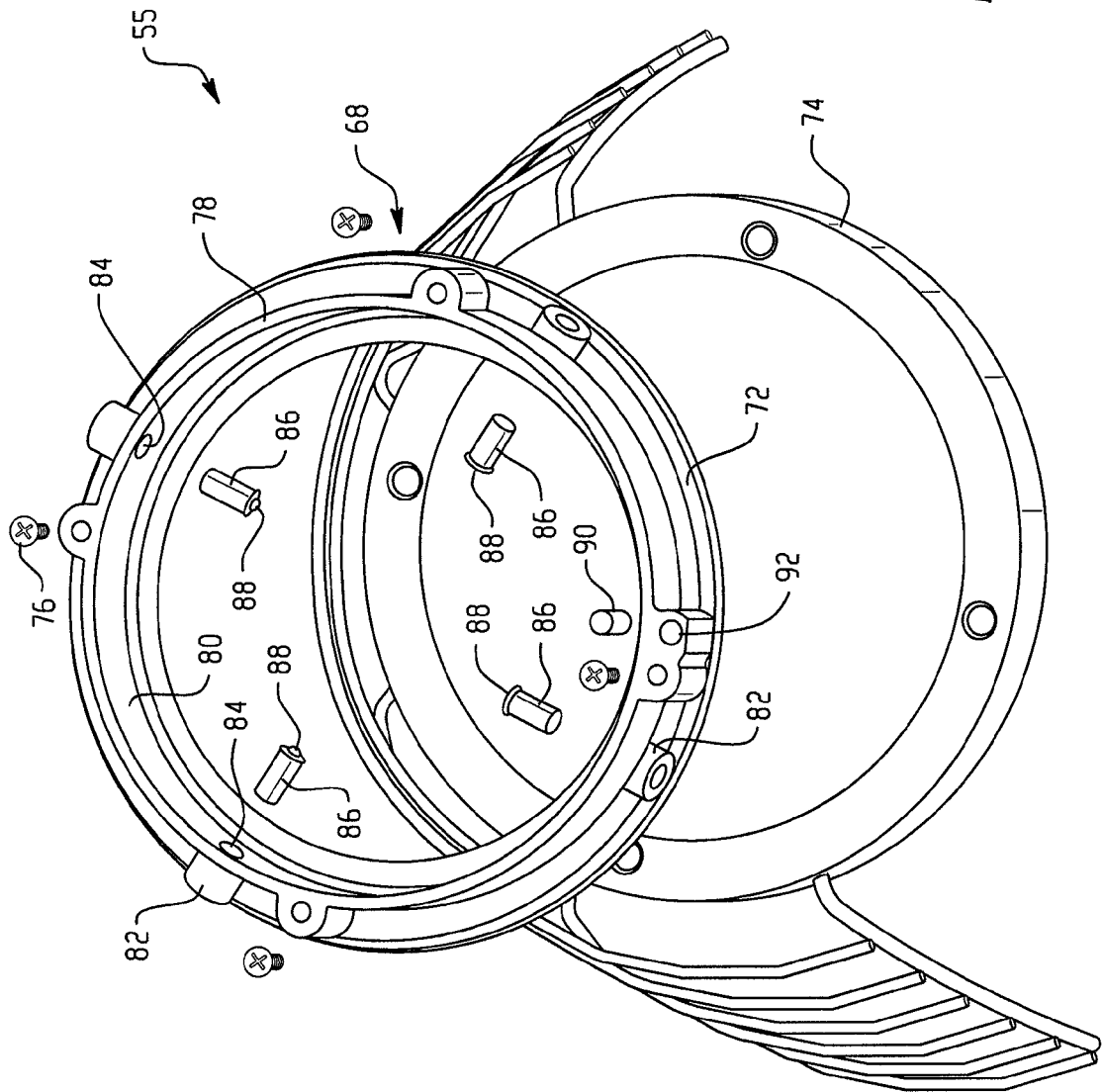
FIG. 4 is an exploded view of the bowl guard assembly of FIG. 3.

The bowl guard assembly 52 includes a moveable member 55 including a ring-shaped housing member 68 and a cage assembly 70 connected to and extending downwardly therefrom. FIG. 4 shows an exploded view of the moveable member 55 of the bowl guard assembly 52. The ring-shaped housing member 68 includes a lower component 72 that connects to an upper component 74, e.g., using fasteners 76. The lower component 72 also includes a circular rim 78 that includes an inwardly facing surface 80. A number of retaining structures 82 (e.g., 4, in the illustrated embodiment) are arranged about the lower component 72 and spaced-apart circumferentially from each other (e.g., about 90 degrees). Each retaining structure 82 has an opening 84 that is sized to receive a ball retainer 86 in a press-fit fashion. In some embodiments, an adhesive may be used to affix the ball retainers 86 within the openings 84. Each ball retainer 86 includes a catch member (in this embodiment, in the form of balls 88). The balls 88 are each biased toward a central axis of the circular rim 78 into an extended position by a spring loaded into each retainer 86. A magnet 90 is fixedly positioned in the ring shaped housing member 68. The magnet 90 may be retained within opening 92. Suitable materials for forming the upper and lower components 74 and 72 include metal and plastic. In some embodiments, the lower component 72 may be formed of plastic, while the upper component 74 is formed of metal.

Figure 5:
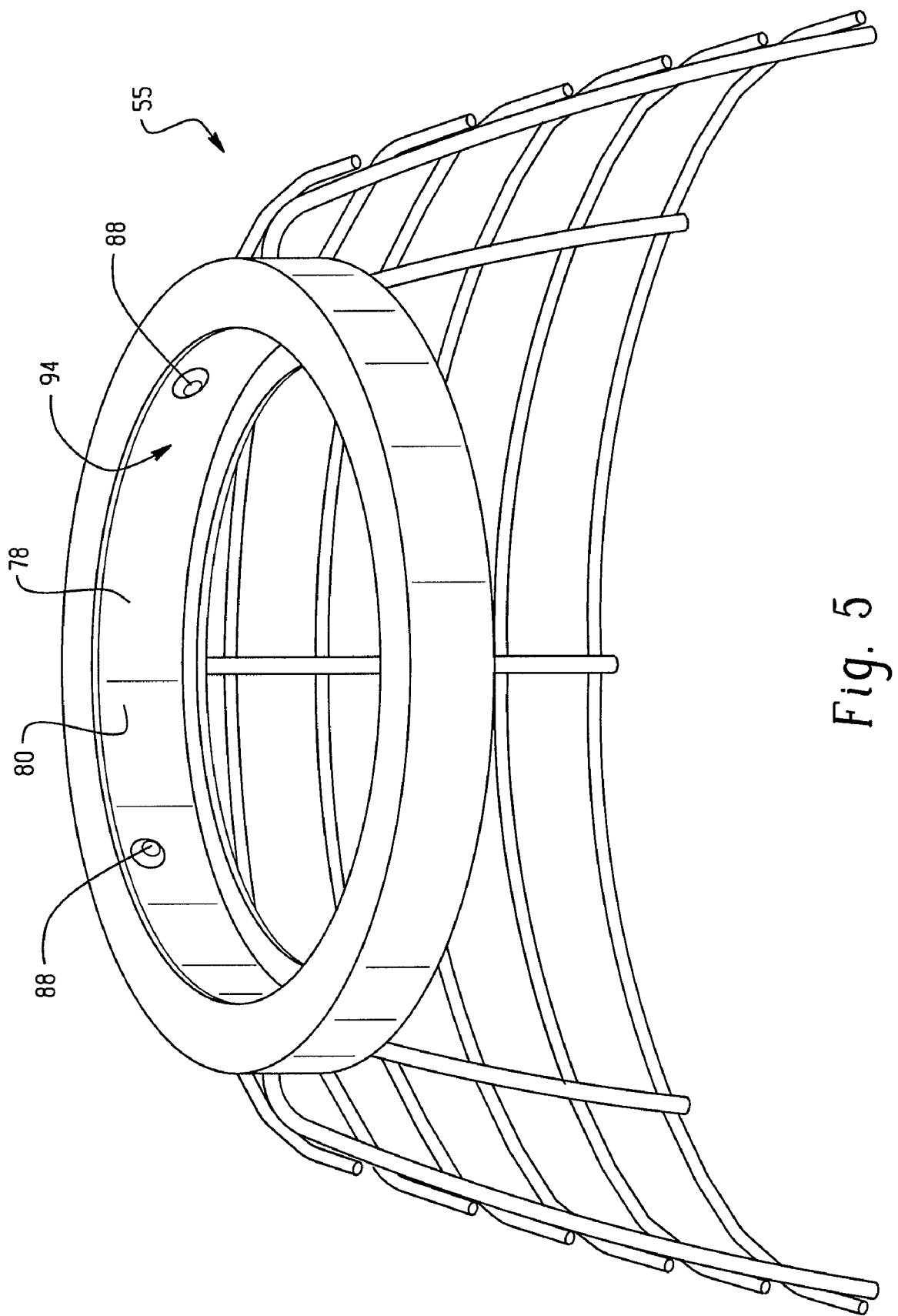
FIG. 5 is a perspective, assembled view of the bowl guard assembly of FIG. 4.

Referring back to FIG. 3 and also to FIG. 5, the balls 88 extend inward beyond the inwardly facing surface 80 of the circular rim 78 and are capable of outward movement relative thereto. Referring particularly to FIG. 3, the moveable member 55 of the bowl guard assembly 52 is connected to the bowl guard support 54 by aligning an opening 94 of the ring-shaped housing member 68 with the bowl guard support 54 and moving the moveable member of the bowl guard assembly vertically upward relative thereto. As the ring-shaped housing member 68 moves past a lower surface 96 of the bowl guard support 54, the balls 88 deflect into their ball retainers 86 relative to the inwardly facing surface 80. Once the balls 88 are aligned with the groove 58, the groove 58 has a width and depth sufficient to allow the balls to move into the groove due to the bias force of the springs. The size of the balls 88 and bias force supplied by the springs are sufficient to lock the moveable member 55 of the bowl guard assembly 52 into a vertical position relative to the bowl guard support 54.

The moveable member 55 of the bowl guard assembly 52 can rotate around the bowl guard support 54 between bowl guarding and bowl access positions. Applying a rotational force to the moveable member 55 causes the balls 88 to move along the groove 58. As indicated above, one or more detents 66 are provided within the groove 58. The detents 66 can be positioned to provide an indication to the operator that the moveable member 55 of the bowl guard assembly 52 is rotated into the proper bowl guarding position. The detents 66 can also provide resistance against rotation of the moveable member 55 once it is placed in the bowl guarding position. To remove the moveable member 55 of the bowl guard assembly 52 from the bowl guard support 54, an operator only needs to apply a downward force to overcome the bias force of the springs and to remove the balls 88 from the groove 58. The moveable member 55 can be removed via a downward movement with the moveable member of the bowl guard assembly in numerous rotational positions. In some embodiments, the moveable member 55 can be removed from the bowl guard support 54 regardless of its rotational position relative thereto through application of a downward force.

Referring still to FIG. 3, the moveable member 55 is also moveable relative to a fixed-position bowl splash guard member 100 of the bowl guard assembly 52, which has a generally closed construction and can be fixedly mounted to the head portion 16 using fasteners 102. In some embodiments, the splash guard member 100 may be of a molded plastic construction and includes an inwardly extending support rim 104.

Figure 6:
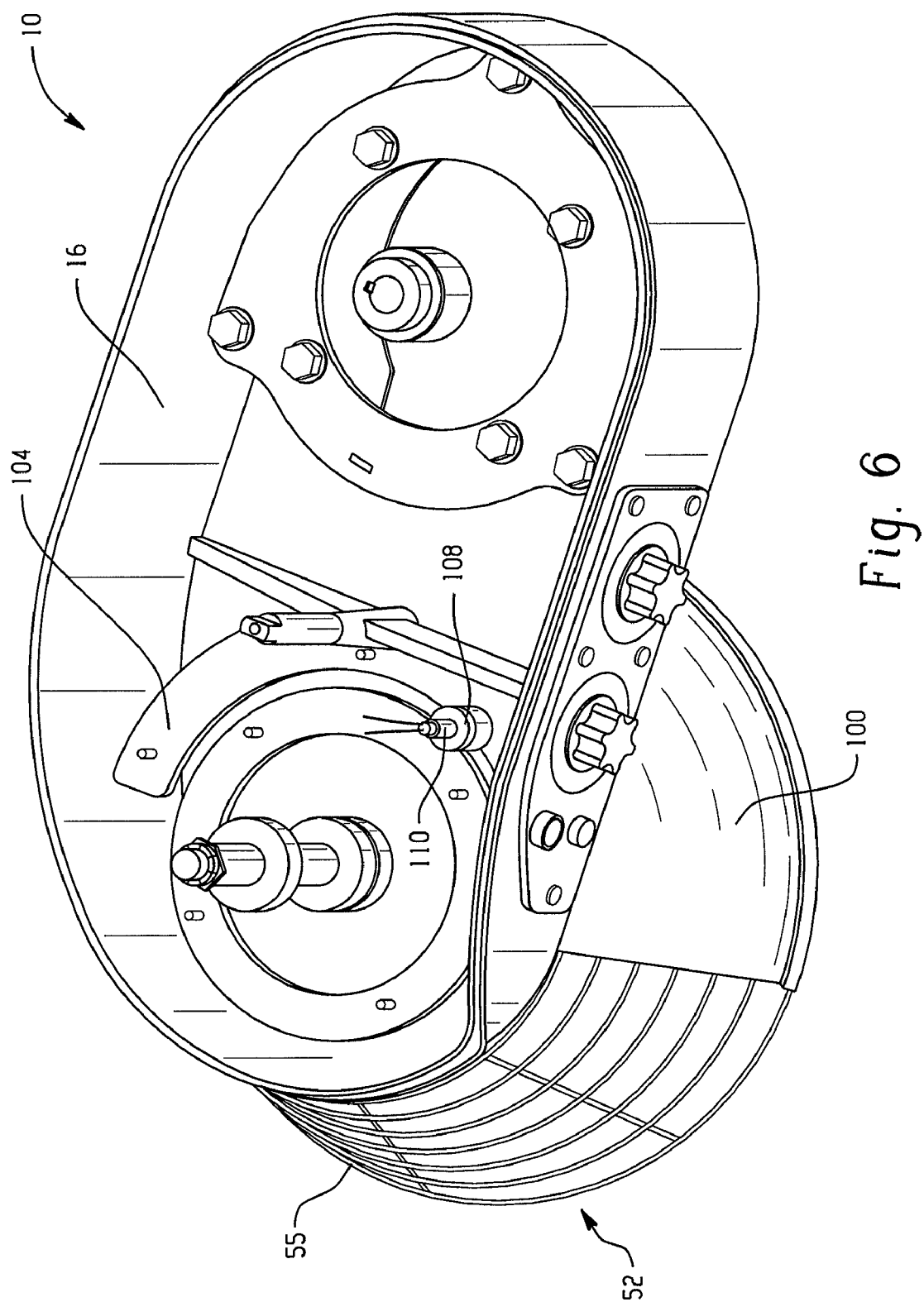
FIG. 6 is a perspective top view of the head portion of the mixing machine of FIG. 1.

Referring also to FIG. 6, the support rim 104 supports a magnetically conductive member 106 located in the head portion 16. The support rim 104 of the splash guard member 100 maintains the position of the magnetically conductive member 106 within a non-magnetic sensor holder 108. A sensor 110 (e.g., a reed switch) is also located in the non-magnetic sensor holder 108. The magnetically conductive member 106 provides a magnetically conductive path that can be used to actuate the sensor 110. Removal of the splash guard member 100 causes the magnetically conductive member 106 to fall out of the head portion through an opening. In this manner, if the splash guard 100 is removed, the magnetic member 106 is also removed, which prevents the sensor 110 from being triggered by the magnet 90. The sensor 110 includes wiring that connects the sensor with the drive system of the mixing machine 10.

When in its proper position, the magnetically conductive member 106 enables the magnetic field from the magnet 90 in the moveable member 55 of the bowl guard assembly 52 to be detected by the sensor 110 when the bowl guard assembly is in its bowl guarding position as the magnet is aligned with the magnetically conductive member in this position. If the moveable member 55 of the bowl guard assembly 52 is rotated out of its bowl guarding position, the additional distance of the magnet 90 from the magnetically conductive member 106 along with the shielding provided by the non-magnetic sensor holder 108 is such that the magnetic field can no longer be detected by the sensor 110. Likewise, even when the moveable member 55 is in the guarding position, the magnet 90 is positioned a sufficient distance from the sensor 110 so that the magnetically conductive member 106 is necessary for a magnetic field from the magnet to trigger the sensor.

In one embodiment the sensor 110 is a switch (e.g., a reed switch) with a conducting state and a non-conducting state, and a guard fault output is provided when the switch is in the non-conducting state. The reed switch may be biased into the non-conducting state, with the magnetic field from the magnet 90 causing the switch to move to its conducting state when the moveable member 55 of the bowl guard assembly 52 is in the bowl guarding position. The drive system of the mixing machine 10 may be configured such that if the reed switch is in the non-conducting state, the drive system is prevented from effecting rotation of the output member 20 of the mixer. Other embodiments in which the sensor 110 includes a state in which its output indicates the bowl guarding orientation and another state in which its output indicates a bowl access orientation are possible. Other functions of the mixing machine could also be disabled based upon sensor 110. By providing an arrangement in which the magnet 90 on the bowl guard assembly 52 must be in a certain position (or in proximity to such certain position) and in which the metallically conductive member 106 must also be in a certain position (or in proximity to such certain position) in order to trigger the sensor 90, movement of the output member 20 is prevented if either one or both of the moveable member 55 and the splash guard member 100 are not properly positioned in a bowl guarding orientation of the bowl guard assembly 52.

Figure 7:
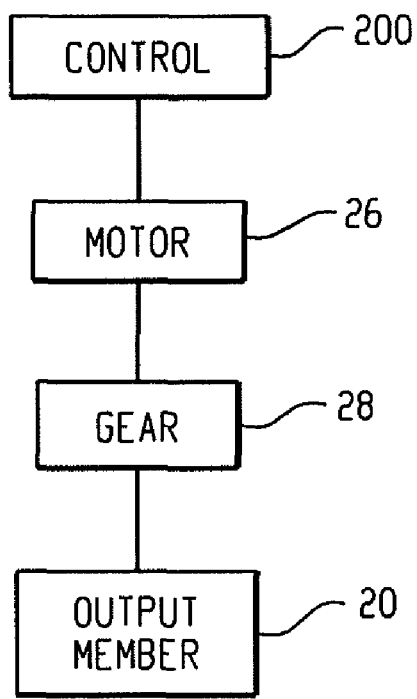
FIG. 7 is a schematic view of an embodiment of a drive system for use in the mixing machine of FIG. 1.

FIG. 7 provides a schematic of a basic drive system that includes a control 200 associated with motor 26 that is in turn connected to gearing system 28 to rotate the output member 20. The bowl guard sensor 110 is connected to and/or may be considered part of the control 200 (e.g., as by providing an electronic input thereto or as by controlling the state of a relay that allows power to be delivered to the motor).

Figure 8:
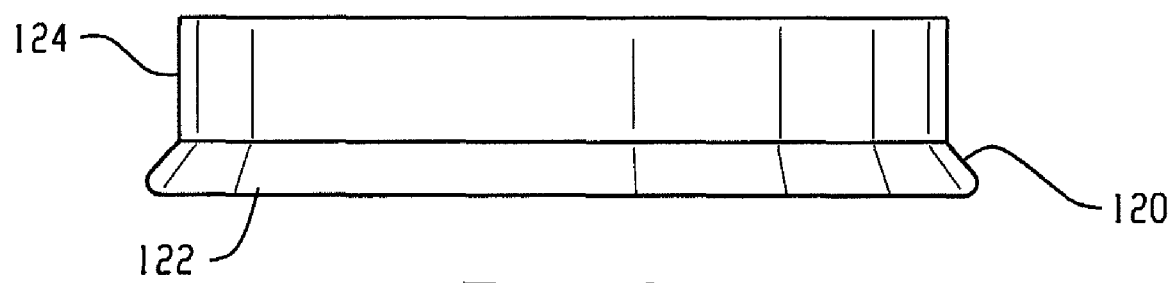
FIG. 8 is a view of track configurations other than a groove.

It is to be clearly understood that the above description is intended by way of illustration and example only and is not intended to be taken by way of limitation, and that changes and modifications are possible. For example, structures other than detent 66 may be used for providing feedback. For example, the groove 58 may include a notch or cut-away at the lower side of the groove into which the balls may fall due to gravity. Additionally, referring to FIG. 8, the track may be configurations other than a groove. For example, the track may be formed by an upper surface 120 of an outwardly extending flange 122 of a bowl guard support 124. Accordingly, other embodiments are contemplated and modifications and changes could be made without departing from the scope of this application.

What is claimed is:

1. A mixing machine, comprising:
a mixer body including a head portion that extends over a bowl receiving location;
an output member extending downward from the head portion toward the bowl receiving location;
a drive system linked to the output member for effecting planetary rotation of the output member;
a bowl guard support at an underside of the head portion, the bowl guard support providing a circular support path in the form of a radially outwardly facing track extending about a periphery of the bowl guard support; and
a bowl guard assembly including a moveable member comprising a housing member with a circular rim and a ball and spring catch member with the ball biased to extend from a radially inward surface of the circular rim and into the track to maintain a vertical position of the moveable member while permitting rotation of the moveable member;
the bowl guard support is configured such that the moveable member can be removed from the bowl guard support by a single vertical movement in the downward direction by which the ball is moved radially outward against the bias of the spring.

2. The mixing machine of claim 1, wherein the track includes at least one detent that aligns with the ball when the moveable member is in a bowl guarding position.

* * * * *